March 25, 1958 M. CHEVILLON ET AL 2,827,834
MULTI-PURPOSE CAMERA
Filed April 16, 1956 8 Sheets-Sheet 1

FIG. 1

INVENTORS
EMANUEL CHEVILLON
ALFRED B. RILEY
BY Walter S. Paul
ATTORNEY

INVENTORS
EMANUEL CHEVILLON
ALFRED B. RILEY
BY Walter S. Pawl.
ATTORNEY

FIG. 19

United States Patent Office 2,827,834
Patented Mar. 25, 1958

2,827,834

MULTI-PURPOSE CAMERA

Manuel Chevillon, Arlington, Va., and Alfred B. Riley, Silver Spring, Md., assignors to Photogrammetry, Inc., Silver Spring, Md., a corporation of Delaware Application April 16, 1956, Serial No. 578,312

12 Claims. (Cl. 88—24)

The present invention relates to multi-purpose cameras which may be used independently or in combination with other parts of copying, viewing or enlarging equipment, such as described in copending application Serial No. 572,507, filed March 19, 1956, for Camera-Projector-Enlarger.

The object of this invention is to adapt a camera for use with equipment of this type, whereby it might readily provide means for selectively receiving images on unexposed film from an easel frame, or projecting the images from an exposed and developed film onto the easel frame for either viewing or enlarging purposes, a projector light source being provided on the top of the camera for such purposes.

A further object is to adapt the camera and its film feeding and supply means to a plurality of sizes of film.

A further object is to provide automatic operation for the camera; and film feed drive means automatically set for different sizes of film to properly advance it one frame at a time, the drive means including cams for operating control switches in properly timed sequence.

A further object is to make a compact camera unit with maximum versatility.

A further object is to provide interlock means to ensure that the film is properly threaded before the camera will operate.

A further object is to provide interlock means to prevent operation of the camera when the film has run out or is accidentally broken.

A further object is to construct the camera so that no tools are required in making any changes in the camera for its different functions or for its use with a different size film.

A further object is to provide the camera with a reversible pressure roller film feed system that is simple and accurate and has no tendency to twist the film or to make it creep over the guides, during forward or reverse feed.

A further object is to provide standard light-tight film magazines adaptable for a plurality of film sizes, and for use as feed or take-up magazines.

A further object is to mount all operating parts on the outside of the rear wall of the camera and making them accessible for repair or adjustment by removing the rear cover of the camera case.

A further object is to provide a solenoid operated slide on the outside of said rear wall, having a pair of mounting posts for each size of film for which the camera is adapted, each pair of mounting posts extending through slots in said wall and spaced a proper distance axially above the lens to normally press a film pressure plate, which may be mounted on the posts, against the corresponding stationary film frame over which the film is guided by threading over the corresponding guide rollers, the pressure plate being removable for transfer to the proper pair of posts in accordance with the size of film being used at the time, the front wall of the camera having a door for access to the film threading mechanism, when installing a film or making other adjustments.

A further object is to provide pressure frames adapted for mounting on the posts in place of the pressure plate to cooperate with the corresponding stationary film frame, when the camera unit is used for projection of developed films.

A further object is to provide a compact condensing lens system on the camera to be used in the projection and viewing phases, and to mount an enclosed light source on top of the camera for supplying uniform illumination to the aperture of the different size film frames.

A further object is to construct a simple but efficient and accurately metering friction roller drive means, meeting optimum space and power requirements, and retaining good tracking qualities through the complicated roller system, for both forward and reverse drive.

A further object is to provide a second solenoid for raising the pressure roller from the drive roller for forward drive, and releasing the pressure roller to the reverse drive roller, in response to setting of the drive motor control for reverse drive.

A further object is to provide readily detachable friction drive means extending from the ends of the camera for driving the take up film reel when the magazine is in mounted position thereon.

Other and more specific objects will become apparent in the following detailed description of the invention, as illustrated in the accompanying drawings, wherein:

Fig. 5 is a detail sectional view taken on the line 5—5 of Fig. 2, Figs. 6, 7 and 8 are detail sectional views taken on correspondingly numbered lines in Fig. 2, Figs. 9, 10, 11, 12 and 13 are detail views, taken on the correspondingly numbered lines in Fig. 1.

The configuration of the complete camera system disclosed in the above mentioned copending application and for which this camera unit is especially adapted, embodies a copy holding board sloping away from the operator at 70° from the vertical; a front surface mirror situated below the copy board and slightly back, the mirror resting horizontally in a carriage which travels vertically; a pair of tubular tracks above and back of the mirror inclined away from the operator 40.5° from the vertical; and a camera carriage travelling on the tubular tracks with the camera axis inclined 20° from the vertical. With the camera in its highest position on the tubular tracks and the mirror in its lowest position, the system is set for the greatest object distance and greatest reduction. As the carriage with the camera is lowered on the tracks, the mirror rises, the two being geared together, thus reducing the object distance by compounded motion.

For camera loading, in order to permit the operator to remain in his normal operating position, the camera, its carriage, and tracks are mounted on a sub-frame pivotally suspended from the rear of the main frame through two steel link arms, two large ball bearing roller guides, and an electric motor-driven jack screw. Jack operation forces the sub-frame upwards, the bottom being confined to a vertical path by the roller guides, while the steel arms carry the top of the sub-frame upward and forward to within easy reach of the operator for film loading or any other adjustments on the camera.

Auto-focusing is accomplished by a bell crank yoke on the lens assembly for adjusting the lens, operated by a push rod extending laterally to one of a plurality of axially extending cams, mounted side by side on the inner side of one of the tubular tracks, the several lens assemblies selectively mountable on the camera, each having a differently located push rod for cooperation with its corresponding cam.

Exposure timing is controlled by an exposure control using the amount of light directed from the enlarged image or copy on the easel to a photomultiplier tube, mounted adjacent the camera lens assembly, to control the rate of discharge of a series of condensers, which, in turn, is used to control a relay operating the enlarger lamp or copy lights respectively, depending on the function for which the apparatus is set.

The camera has a light-tight casing 10 including a removable front wall 10', having a door panel 11 in its lower half, hinged at 12 and provided with a door knob 13, turnable to locked and unlocked positions. The door in locked position operates a safety switch 14 which normally breaks the jack-screw motor circuit, so that the camera carriage cannot be returned to its normal operating position while the door is opened for camera loading, and keeps the red signal light 15 glowing until the door is closed and locked. Another small door panel 11' may be provided in the upper half of the front wall 10' with a door knob 13', for access to the condenser lens for cleaning, etc.

The bottom of the casing is provided with a selected lens assembly 16, the base of which is removably clamped and held in place by clamp screw 17. The lens is adjustably mounted for focusing by means of a bell crank yoke 18 pivotally mounted in bracket 19 and operated by a push rod 20 normally biased outwardly by spring 21 for greatest distance. When the camera is mounted on its carriage, the end of the push rod 20 rests against the proper cam on one of the tracks referred to above, and is actuated thereby in accordance with the adjustment of the camera carriage on the tubular tracks, to provide autofocusing.

Figure 14:
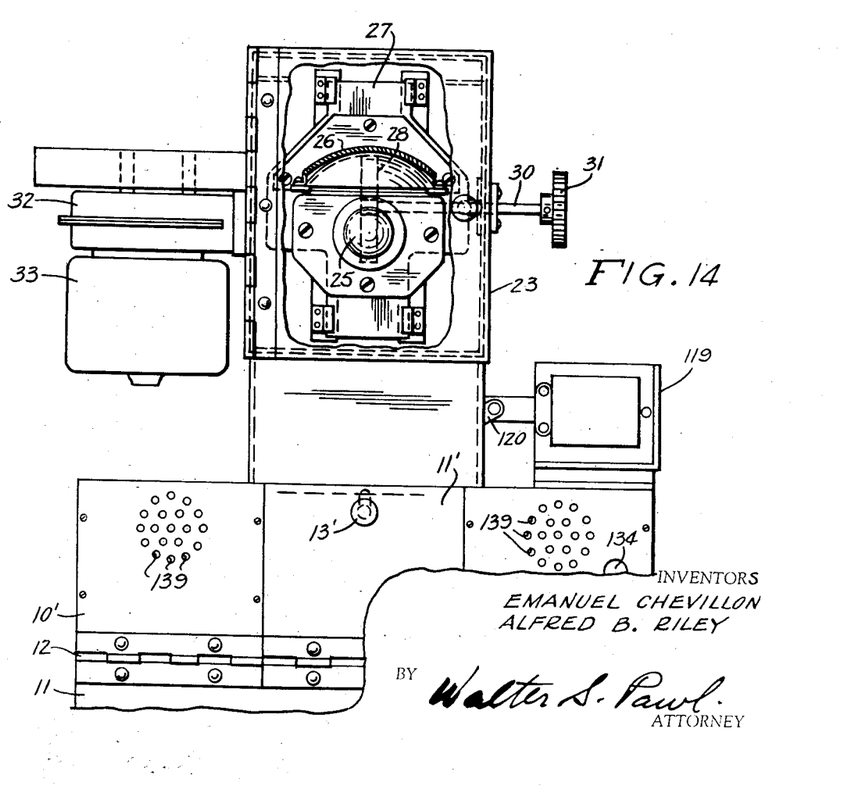
Fig. 14 is an elevational view, partly in section, on a slightly reduced scale, of the enlarger and projector lamp on top of the camera casing, showing the cooling fan and motor on the side of its housing.
Figure 15:
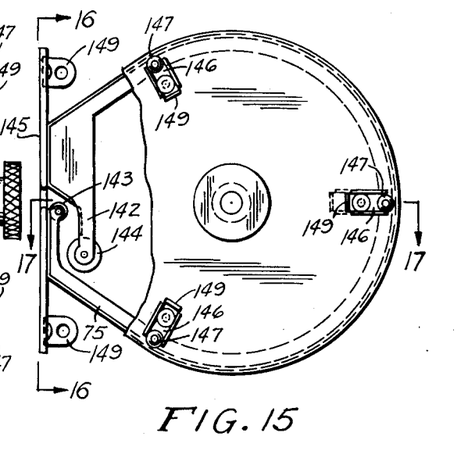
Fig. 15 is an elevational view of one of the standard film magazines, with a portion of the removable front wall removed to show details of the light-trap.
Figure 16:
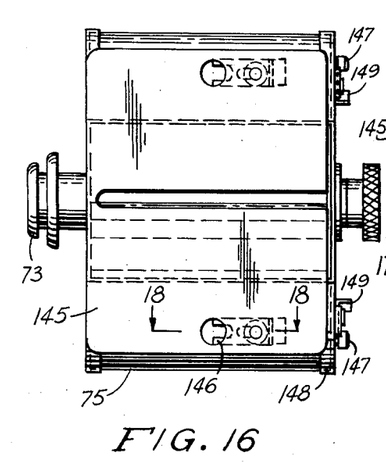
Fig. 16 is a bottom view of the magazine as seen along the line 16—16 of Fig. 15.
Figures 17, 18, 20:
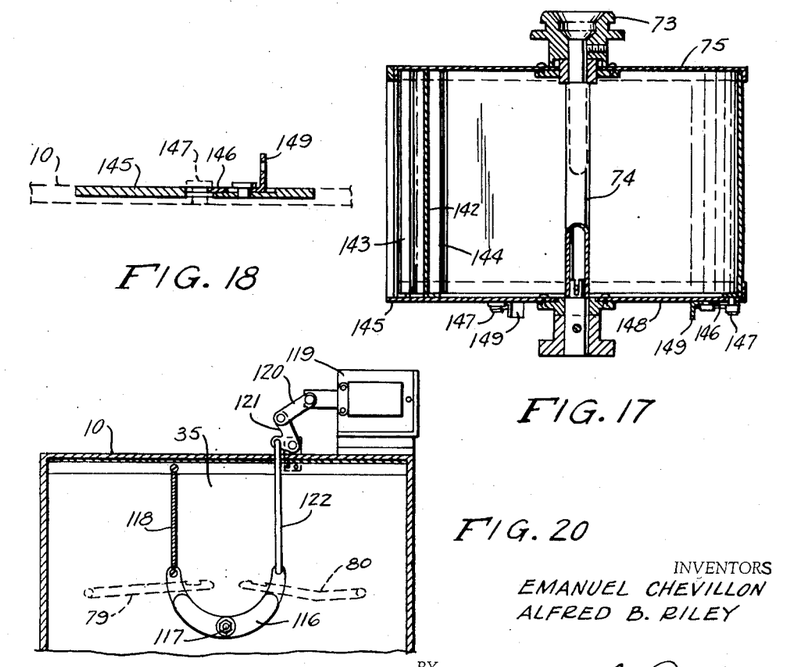
Fig. 17 is a sectional view of the magazine taken on the line 17—17 of Fig. 15.
Fig. 18 is a detail sectional view of the quick mounting means in the base of the magazine, taken on the line 18—18 of Fig. 16.
Fig. 20 is a detail sectional view taken on the line 20—20 in Fig. 3.

The top of the camera casing has an aperture 22, over which the enlarger and projector light housing 23 is mounted, and below which is mounted a collector lens 24 suitable for providing the proper light concentration on the film frame apertures for the enlarging or viewing functions. A lamp 25 with a reflector 26 are mounted on an axially adjustable platform 27 by means of a rack 28 and pinion 29, with a shaft 30 extending outside the housing and provided with a turning knob 31. A cooling fan 32 driven by motor 33, may be mounted on the side of the housing 23 as shown in Fig. 14.

The back wall 34 serves also as a base or chassis for all the operating parts of the camera and is held in the casing 10 forwardly of the rear cover 35 to afford space for the roller release solenoid 36 axially mounted in the upper portion of this space, and the drive gear, control cams and switches, terminal plugs, etc. The condensing lens 24 is mounted between partitions 37 and 38 extending forwardly from the back wall 34 to the front wall 10'. Horizontal shelves 39 and 40 on the back wall 34 extend from the bottoms of these partitions to the left and right ends, respectively, of casing 10 to form compartments in which the motors 41 and 42 are mounted, with their shafts passing through the back wall 34, to provide a drive sprocket 43 on the shaft of motor 41 and bevel gear 44 on the shaft of motor 42, on the other side of this wall.

Below the condensing lens are axially spaced frame holders 45 and 46 for holding 70 and 35 mm. film frames 47 and 48, respectively, in their proper planes in the camera casing above the lens assembly 16. A partition 49 fixed to the bottom of back wall 34, extends between the front and back walls 10' and 34 of the casing 10, and is apertured at the center to accommodate projection of the light beams between the lens 16 and the film frames. A pair of end spacers 50 are fixed to the bottom of this partition 49 to provide a space 51 between the bottom wall of the camera casing and the partition 49. A bearing stud 52 is mounted at the bottom of the back wall 34 for supporting the rotary shutter disc 53 in this space 51. Disc 53 has an aperture 54 which may be brought into registry with the lens aperture in the bottom wall of casing 10 for the viewing phase, and may be rotated past this aperture at controlled speed for timing the exposures for copying or enlarging. Disc 53 has a gear 55 integral therewith which is driven by the motor 42 through the bevel gears 44, 56, flexible cable shaft 57 and drive gear 58 which meshes with gear 55 on the disc.

Film drive rollers 59 and 60 for forward and reverse drives, respectively, are rotatably mounted in rigid yoke-type bearing supports 61 fixed to the front of back wall 34, to receive the film from, or deliver it to, the film magazine on the corresponding side of the camera through a film slit 62 in the wall of the camera casing 10. Similar fixed supports 61 are provided for the guide rollers 63 for guiding the 70 mm. film over the 70 mm. film frame 47, and shorter but similar fixed supports 64 for the shorter guide rollers 65 for guiding the 35 mm. film over the 35 mm. film frame 48. Rigid yoke-type bearing supports 66 for the pressure rollers 67 are rotatably mounted on the under side of shelves 39 and 40, respectively, and are biased to urge the pressure rollers with a suitable pressure against the film 68 which is threaded over the respective drive roller. Pressure rollers 67 and guide rollers 63 and 65 are freely rotatable, preferably on anti-friction bearings, and the drive rollers 59 and 60 are freely rotatable in their bearing supports 61 but their shafts 69 and 70 extend through the back wall where each is connected to a drive sprocket 71 through a built-in clutch for causing the roller to drive in its driving direction, but permits it to free-wheel in the opposite direction. Each sprocket has a pulley 72 fixed to it for driving the take-up reel in the magazine on its respective side when it is not on the driving side. An elastic friction slip belt is used between this pulley and the external pulley 73 of the reel shaft 74 of the standard film magazine 75. When not in use this belt is slipped off the pulley 73 and allowed to hang free on the side of the camera casing 10, its inner loop remaining in place over the pulley 72. An internally grooved U-shaped guide member 76 extends from the openings through which the belt is passed into and out of the casing 10, and around the back of the pulley, so as to hold the belt on the pulley 72 at all times and to facilitate threading it around the pulley from the outside of the casing 10, whenever it is installed upon assembly or replacement. The belts are preferably of the steel-spring type and are cut to the proper length to provide optimum tension on the magazine shafts. Each belt is passed around its respective pulley 72 by pushing one of its ends into the proper opening in the side wall of the camera casing 10 until it comes out the other opening, then screwing its ends together. The screwing together of the ends may be simplified by first giving the ends several turns of reverse twist, thus enabling the formation of a smooth loop with no tendency to twist after the ends have been untwisted by screwing them together an equal number of turns.

Mechanism is provided for moving one of the pressure rollers 67 off of its drive roller 59 or 60 when the drive is reverse or forward respectively, or for lifting both pressure rollers off their respective drive rollers, for threading or film adjusting purposes.

During normal forward driving, as in copying, roller 59 does the driving and pressure roller 67 on the other side of the camera is held away from the roller 60 which is free to turn because its sprocket is not turned in its drive direction. However, when drive motor 41 is reversed for reverse drive which is the drive direction for drive roller 60, the pressure roller on the side of roller 60 is released and the pressure roller on the other side is moved off of roller 59, which is then free to rotate because its sprocket 71 is now turning in reverse direction. Whenever reversing the drive, the belt is slipped off the feed reel and the other belt is slipped over the take-up reel pulley.

The supports 66 for the pressure rollers 67 have their shafts 77 and 78 extended through the back wall 34, where lifting levers 79 and 80 are eccentrically pivoted at 81 and 82 and extend inwardly substantially horizontally when raised on their pivots to rest under the extended ends of shafts 77 and 78 respectively, in which positions the inner ends of the levers 79 and 80 normally rest on, and are held by screw studs 83 and 84 extending from a vertically slidable platt 85 having a lost motion connection by means of an axially extending slot therein and a pin 86 extending through the slot from the armature 87 of solenoid 36.

The armature 87, being connected to the normally downwardly biased pressure plate support platform 88, lifts the pressure plate 89 off the respective film frame, depending on which pair of support posts 90 the pressure plate 89 happens to be mounted on. These posts 90 are fixed to the platform 88 and extend through axially extended slots in the back wall 34. The pressure plate 89 is mounted on the upper pair of posts over the large apertured film frame 47 for 70 mm. film use, but may be moved to the lower pair of posts over the small apertured film frame 48 after it is inserted in the frame holder 46 to move a control lever 91 mounted on the holder 46, and normally biased on its pivot to extend into the space occupied by a part of frame 48. This automatically sets the cyclic advancement of the film for the 35 mm. film, by means of a control switch 92 on the other side of the back wall 34 actuated by a cam 94 on an extension of the pivot 93 of lever 91.

Figure 1:
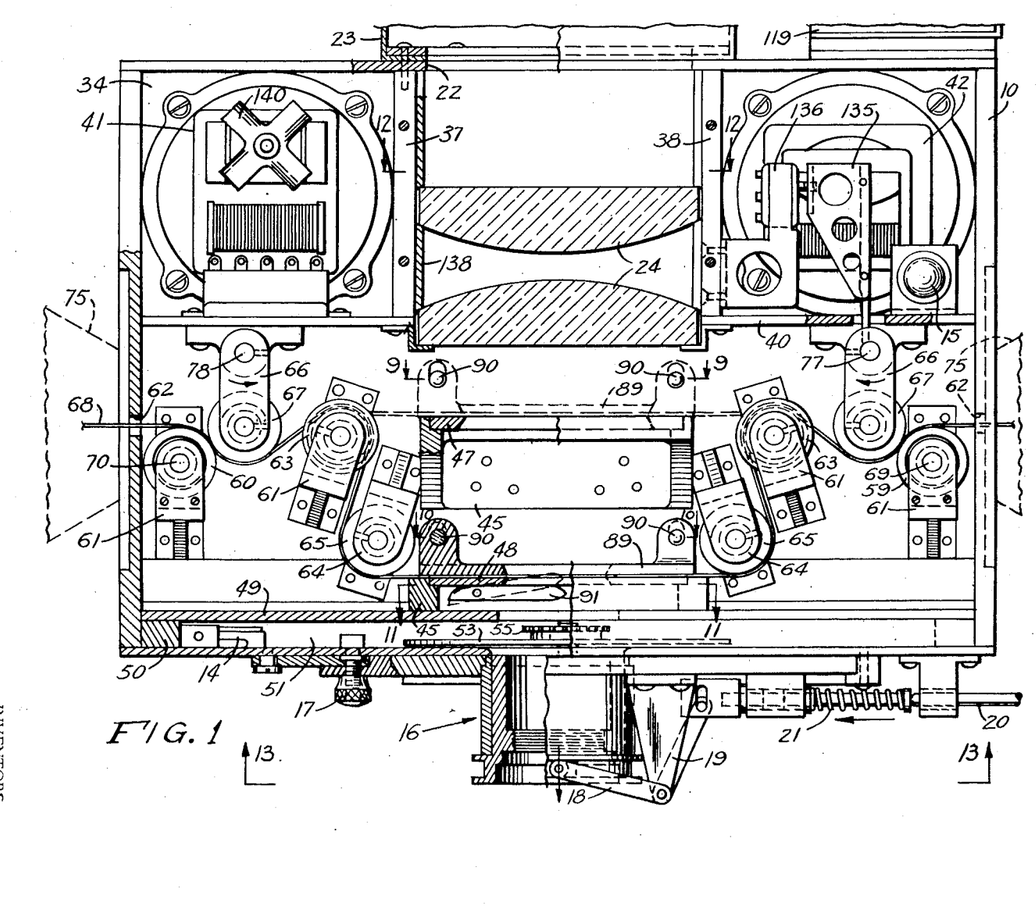
Fig. 1 is a front elevational view of the camera, partly in section, with the front wall of the casing removed.
Figure 2:
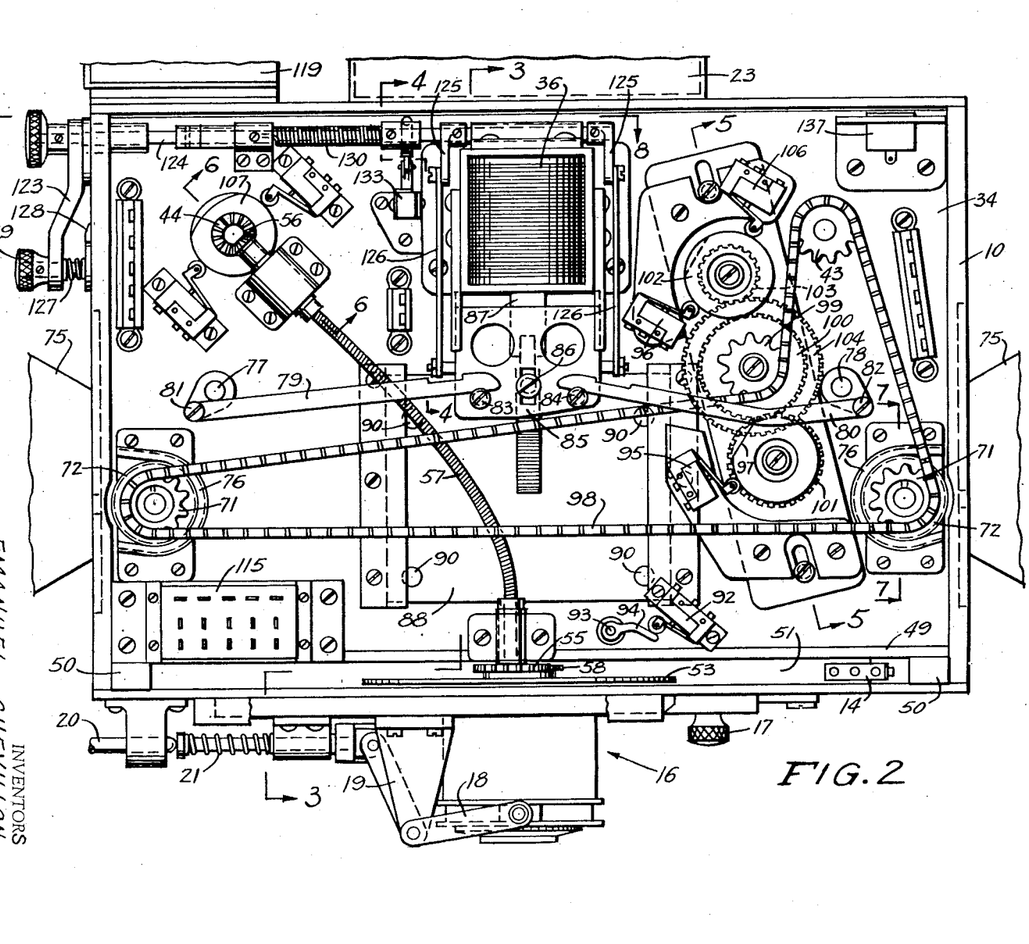
Fig. 2 is a rear elevational view of the camera, with the rear cover of the casing removed.
Figures 3, 4:
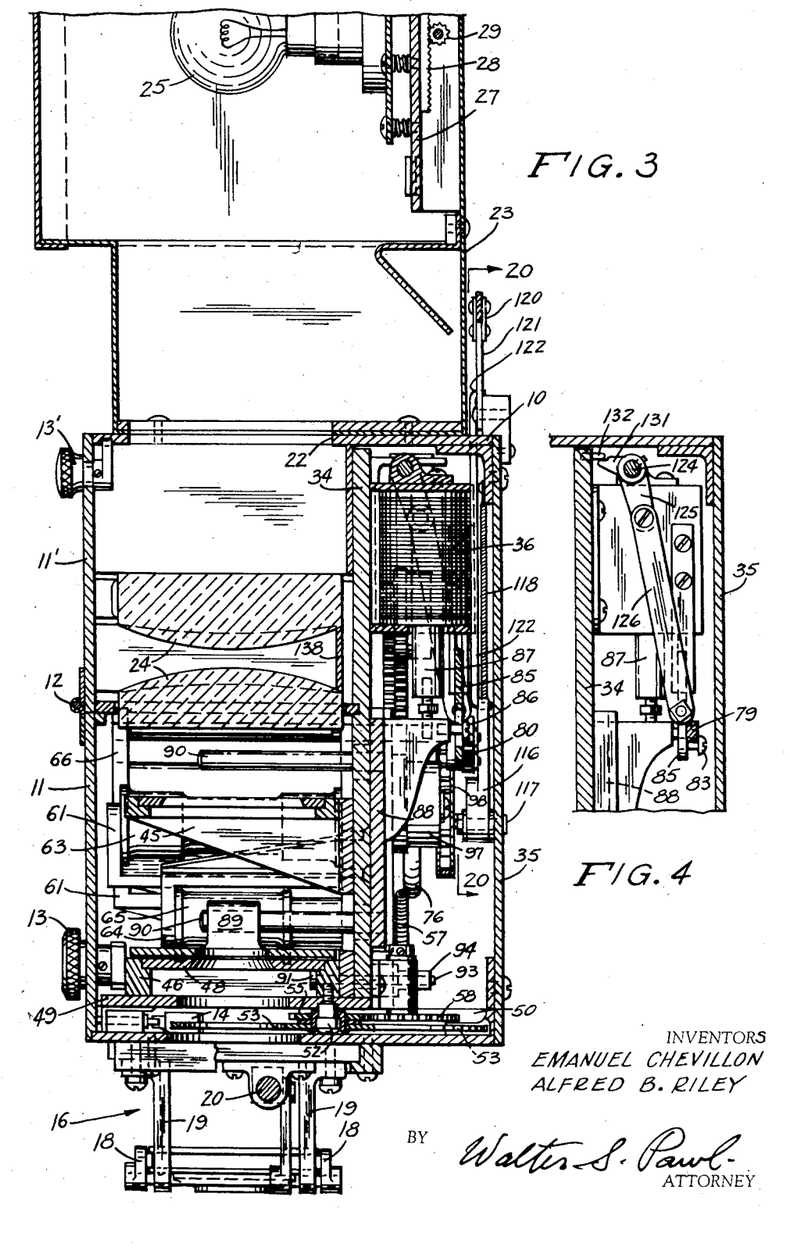
Fig. 3 is a sectional view taken along the line 3—3 of Fig. 2.
Fig. 4 is a detail sectional view taken on the line 4—4 of Fig. 2.
Figures 5, 6, 7:
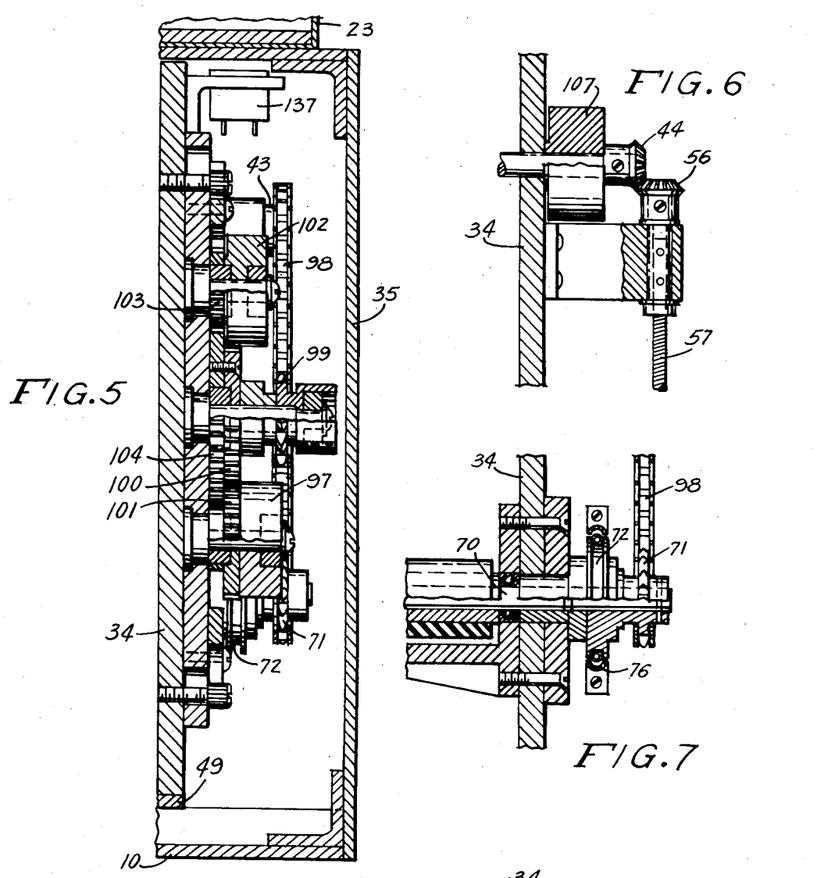
Figure 8:
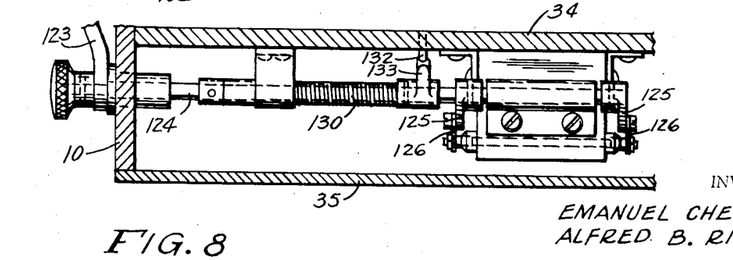
Figure 9:
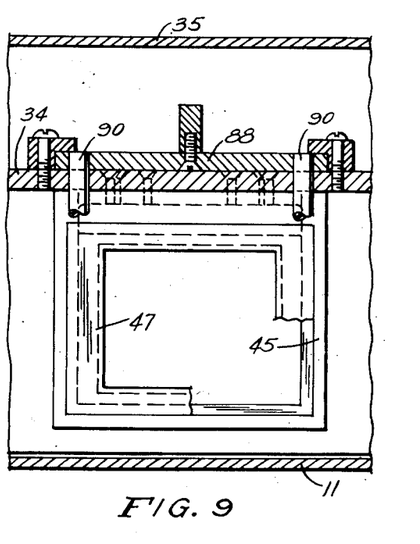
Figure 10:
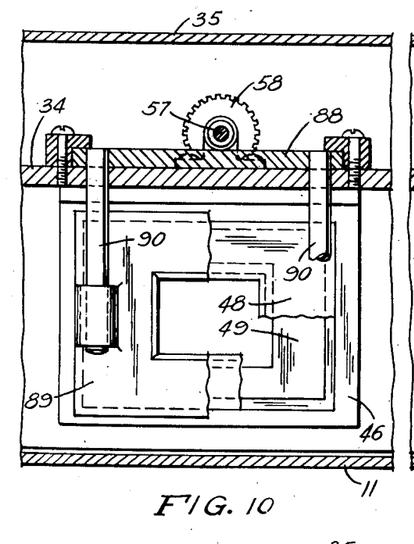
Figure 11:
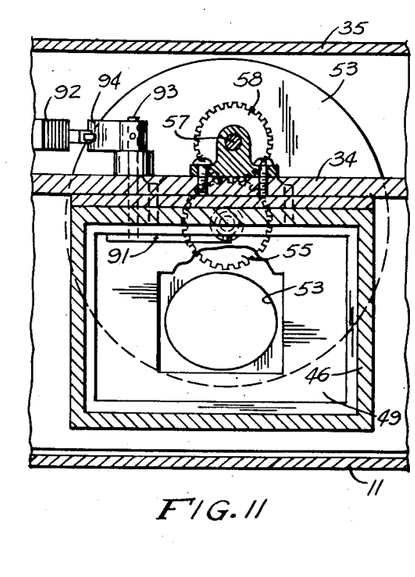
Figure 12:
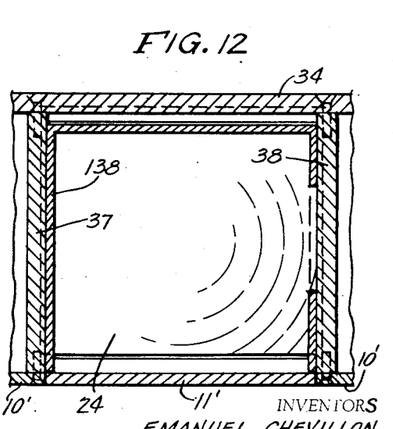
Figure 13:
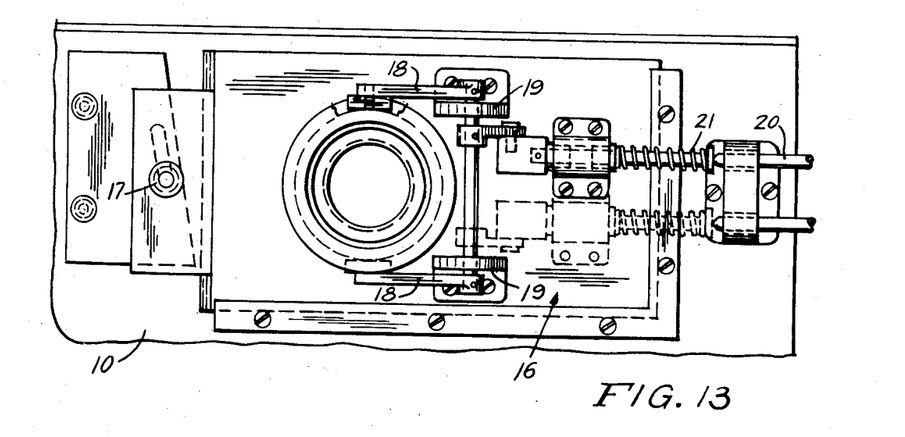

For use in viewing and enlarging, the pressure plate has to be apertured, and separate pressure plates may be provided for the different aperture sizes required for the two sizes of film, as indicated in the drawings, Figs. 1, 9 and 10.

Whenever 70 mm. film is used, the pressure plate 89 is manually mounted on the upper posts 90 over the 70 mm. film frame 47 in the holder 45. The film frame 48 is removed from the holder 46 in order that the biased lever 91 may move up and actuate the switch 92 to disconnect the 35 mm. feed control circuit and connect the 70 mm. feed control circuit, so that the film drive roller will move the film a proper amount for one frame of the 70 mm. size during each feeding cycle.

The drive rollers 59 and 60 are of a diameter such that one complete turn will move the 70 mm. film the required amount for one cycle, and one half of a turn will move the 35 mm. film its required amount for one cycle. The corresponding control circuits for the drive motor are controlled by switches 95 and 96 respectively. Switch 95 is operated by a cam 97 that is driven by this motor at the same rate as the drive rollers through the chain 98, sprocket 99 with gear 100 meshing with the gear 101 which drives the cam 97. Switch 96 is operated by cam 102 on the shaft of gear 103 which is driven at double the speed by the large gear 104 on the sprocket 99, so that switch 96 will perform a cycle in one half a turn of the drive rollers. Additional switches such as 105 and 106 may be mounted around the cams 97 and 102 for operating other circuits such as counters, etc.

Figure 19:
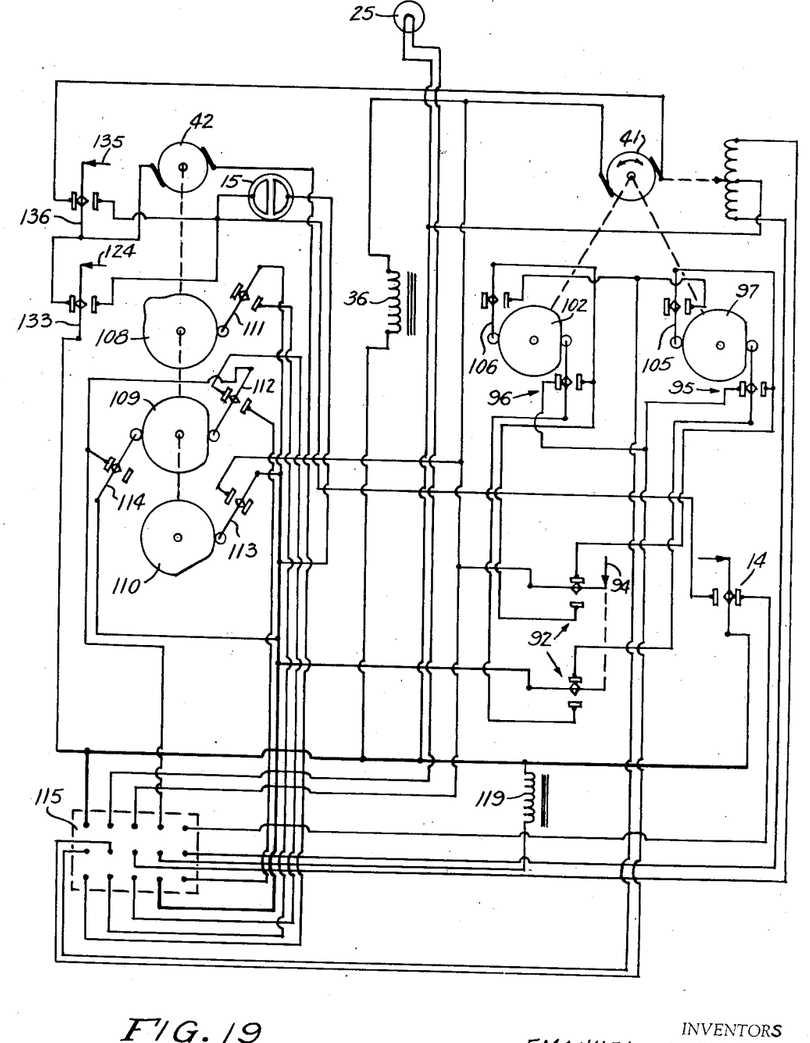
Fig. 19 is a schematic wiring diagram of the control circuits that may be used in this camera.

Several control switches for actuation cyclically with the shutter disc, may be positioned around the cam 107 on gear 44. In the present disclosure cam 107 has three cam surfaces, diagrammatically shown in Fig. 19 at 108, 109 and 110, for operating four switches, three of which 111, 112 and 113 are lined up on one side, and the fourth 114 is mounted on the opposite side for operation by the same cam surface 109 as switch 112. These switches may be used, as in the present instance, for turning the shutter disc one turn per cycle to open and close the shutter at controlled speeds for getting proper time exposures, to start a film advance cycle after the shutter closes, to stop the shutter in open position, etc.

A male multi-terminal plug 115 is provided in the right rear lower corner of the camera casing for receiving a mating female plug through an opening in the rear cover 35. The electrical elements in the camera may thus be properly connected through these terminals and a cable to the control switches and indicators on the operating panel of the camera-viewer-enlarger apparatus, for automatic operation in accordance with the settings of the controls on a control or operating panel.

The lifting of the pressure plate platform 88 by means of the solenoid armature 87 electrically, has no effect on the plate 85 and the lifting of the levers 79 and 80, because of the lost motion slot connection at pin 86. Thus the forward film advance may be properly performed with the pressure roller pressing on the drive roller without interruption, the other pressure roller being normally lifted by a curved lever 116 pivoted at 117 on the rear cover 35. This lever is normally biased by spring 118 which is sufficiently strong to lift lever 80 against the bias of the pressure roller spring.

For reverse feed, as may be required when viewing or enlarging, when the motor direction is reversed, the reverse switch automatically energizes a solenoid 119 which may be conveniently mounted on top of the camera casing 10 at the right rear corner thereof, and through the link 120, bell crank 121 and rod 122, moves the lever 116 against the tension of the spring 118 to release lever 80 and raise lever 79. This permits the pressure roller on the drive roller 60 to press against it, and moves the other pressure roller away from drive roller 59, as required for the reverse feed of the film.

During threading operation, however, it is necessary to release both pressure rollers and raise the pressure plate platform 88. This is accomplished manually by a lever 123 which is pivoted at the rear top corner of the right side of the camera casing 10, and extends forwardly. It is keyed to shaft 124 with arms 125 having side links 126 connected to the sides of plate 85 for lifting the plate when the lever 123 is depressed. When the lever 123 is fully depressed, lifting plate 85 sufficiently to take up the lost motion at the pin 86 and to lift not only both pressure rollers but also the pressure plate 89, the lever 123 may be latched, as the spring-pressed pin 127 moves over the shoulder of lug 128. When this latch is released by pulling out on the knob 129, the weight of the hanging plate 85 and connected mechanism, aided by the return spring 130, lowers the plate and lifts the lever until the arm 131 on shaft 124 returns to and rests against the stop 132 on the back wall 34. A switch 133 may be mounted under the shaft 124 for operation by a cam on shaft 124 to close a signal circuit to turn on the signal light 15, whenever the arm 131 is not up against its stop 132, to indicate that the lever 123 is not fully released. Switch 133 simultaneously breaks the motor drive circuit when it turns on the light 15, which may be located back of a red window 134 in the front wall 10'.

In the event of a film break, or if the film should run out past the drive roller 59, the yoke-arm of the adjacent pressure roller 67 is turned sufficiently, as the pressure roller drops or swings against the bear drive roller 59, to move a pivoted lever 135, extending from this yoke-arm, to actuate a safety switch 136, which is also in the signal light and motor drive circuits, to break the latter circuit and make the signal light circuit, in the event of a break in the film, so as to prevent operation of the camera without a film supply and to indicate visually by the signal light that something is wrong, just as in the case of incomplete return of the pressure plate release control lever 123.

The removal of the front wall 10' with its panel doors 11 and 11', permits the removal of the back wall assembly as a unit, which includes all the operating parts of the camera as described above. It is advisable, however, to first withdraw the condensing lens parts, which are the two lenses 24 and the separator 138, because these parts may fall out accidentally. The pressure plate may also be lifted out off its mounting posts 90, and the film frame removed. Obviously, the female plug, at the right rear lower corner is also pulled out, and the male plug at the top of the casing, for the viewing and enlarging lamp circuit, is pulled out of the female and male connecting wall plug 137, provided on the upper right rear corner of the back wall 34. The assembly may then be eased out of the casing 10 by grasping the strong film frame holder 45, with the fingers passed through its aperture. After pulling out the assembly, it may be placed on a level surface, the side bars 50 resting flat and providing a space under the shelf 49 for the shutter disc, thus protecting it from injury. The female plug may then be reinserted over the plug 115 by pulling the supply cable out of the apparatus, and all the operating circuits connected through this cable will then be ready for testing, and the parts may be conveniently checked and adjusted or repaired when necessary.

Ventilation perforations 139 may be provided in the front wall 10' for the motor compartments, and a ventilating fan 140 on motor 41, which is sometimes pretty well loaded, may be used if necessary, to prevent overheating.

The standard film magazines 75 are provided with light traps at the feeding slit by forming an overlapping internal wall 142 and providing small radius guide rollers 143 and 144 at the lips of the passage thus formed, for eliminating film contact with stationary corner surfaces as the film passes in or out from the reel through this light trap. Other forms of light traps might be devised, as e. g. a hinged internal flap over the slit, opened by a lug on the mounting surface of the camera casing adjacent the slit 62, as the magazine is mounted on the camera, to relieve the pressure of the flap on the protruding film during feeding. The base 145 of the magazine is provided with mounting slides 146, having U-shaped wedge portions for wedging under the heads of pins 147, rigidly fixed in and protruding from the mounting surface of the camera through openings provided therefor in the base 145, adjacent the slides 146.

The front wall 148 of the magazine is made easily removable by providing similar wedge slides 146 in the outer face of this wall, and pins 147 in the front edge of the peripheral wall of the magazine, the wedge slides being movable radially inwardly to release position. Slides 146 have turned up ears 149 to facilitate finger operation.

The width of the magazine is standard for 70 mm. reels, but is provided with spacer collars, one for each side of a 35 mm. reel to loosely fit over the shaft 74 and hold the 35 mm. reel in the center of the magazine, when the front wall 148 is in place.

Many obvious modifications in the form and arrangement of parts of the herein illustrated camera may be made without departing from the spirit and scope of the invention as defined in the appended claims.

What is claimed is:

1. In a camera having a casing with removable front and rear walls, means for mounting a selected lens assembly on the bottom wall, means for mounting a projection light source on the top wall, exchangeable film supply and take-up magazines having standard mounting bases adaptable for mounting on the side walls of said casing, copying and projection lens assemblies adaptable for selectively mounting on said bottom wall, friction roller film feeding means in said casing for advancing the film one frame at a time in forward and reverse directions, a film frame support with a removable film frame over which the film is threaded, a full surface film pressure plate, a biased mounting for the film pressure plate above said film frame, means for moving said pressure plate mounting against said bias to lift said pressure plate and release the film whenever the film is advanced, a film pressure frame adapted to be inserted on said biased mounting in place of said film pressure plate to adapt the camera for use with a developed film for projection viewing or enlarging work, motor operated shutter means in said casing, selective cyclic control means including means for timing the shutter opening for copying and means for keeping the shutter open and timing the projection light for enlarging, and means for advancing the film one frame while moving the biased mounting to release the film while it is advanced during the selected cycle; the combination wherein said film advancing means including a reversible motor, and forward and reverse contact drive rollers in said casing, driven by said motor through one-way clutch means in their respective drive directions, whereby one of said drive rollers may freewheel while the other is driving the film, and said means for moving the pressure plate mounting including a solenoid armature.

2. A camera as defined in claim 1, a back wall removable through the front of the casing, all the camera parts in said casing being mounted on said back wall, whereby, when the front wall is removed, the camera parts enumerated may all be removed from the casing in their operative assembly for convenience in testing and repair or adjustment, and when the rear wall is removed, the operating parts on the rear of the back wall may be inspected, repaired and adjusted without removing the assembly from the camera casing.

3. A camera as defined in claim 2, said front wall having a hinged door panel sufficiently large for access to the film feeding mechanism in said casing to facilitate threading of the film therethrough without removing the entire front wall.

4. In a camera having a casing with removable front and rear walls, means for mounting a selected lens assembly on the bottom wall, means for mounting a projection light source on the top wall, exchangeable film supply and take-up magazines having standard mounting bases adaptable for mounting on the side walls of said casing, copying and projection lens assemblies adaptable for selectively mounting on said bottom wall, and friction roller film feeding means in said casing for advancing the film one frame at a time in forward or reverse directions; the combination of a plurality of film frame supports appropriately spaced for each size of film above said lens assembly mounting, a removable film frame for each support, over which the film is threaded, a film pressure plate, a biased mounting means for the film pressure plate having a separate insertion place for the pressure plate over each of said film frames, and means for moving said pressure plate mounting against said bias to lift said plate from the respective film frame and release the film whenever the film is moved.

5. A camera as defined in claim 4, and a film pressure frame for insertion in each of said places on said biased mounting means in place of said pressure plate to adapt the camera for use with a developed film for projection or enlarging.

6. A camera as defined in claim 5, motor operated shutter means in said casing, and selective cyclic control means including means for making an exposure by timing the shutter opening for copying, and means for keeping the shutter open and timing the projection light source for enlarging, and means for then advancing the film one frame for the respective sizes of the films while moving the biased mounting to film-released position during the selected cycle.

7. In a camera having a casing, a removable chassis in said casing comprising the assembly of all the internal parts mounted on the rear light-sealing wall of said camera, a removable light-sealing front wall, whereby the entire chassis assembly may be withdrawn from the casing after the front wall has been removed, without disturbing the operative relations of the parts on said chassis, to facilitate testing, adjustments and repairs, said casing having a removable rear wall, said chassis wall being substantially parallel to and spaced from the rear wall to accommodate the parts extending from the rear of said chassis wall, said chassis being held in place by said front wall and being removable from said casing by sliding out forwardly when the front wall is removed; the combination wherein said front wall has a hinged door panel for access to the film threading means through the camera, a door lock for said door panel, and a safety signal light on the camera responsive to unlocking of said door, whereby the light will show when the door panel is not closed and locked.

8. In a camera having a casing, a removable chassis in said casing comprising the assembly of all the internal parts mounted on the rear light-sealing wall of said camera, a removable light-sealing front wall, whereby the entire chassis assembly may be withdrawn from the casing after the front wall has been removed, without disturbing the operative relations of the parts on said chassis, to facilitate testing, adjustments and repairs, said casing having a removable rear wall, said chassis wall being substantially parallel to and spaced from the rear wall to accommodate the parts extending from the rear of said chassis wall, said chassis being held in place by said front wall and being removable from said casing by sliding out forwardly when the front wall is removed; the combination wherein the internal parts include one or more film frame holders fixed to the front of said chassis wall, each holder provided with a film frame for the corresponding sizes of film and appropriately spaced above the lens aperture in the bottom wall of said casing, a drive roller and a cooperating pressure roller near each of the opposite sides of the camera casing, for forward and reverse drive, and a guide roller on each side of each film frame holder, having guide shoulders for the corresponding size of film to be guided thereby, yoke-type bearing supports for all rollers, the supports for the drive and guide rollers being rigidly fixed to said chassis wall, the support for the pressure rollers being pivoted in said chassis and biased to press their rollers against the respective drive roller, and means for normally raising the pressure roller off the reverse drive roller.

9. A camera as defined in claim 8, a reversible drive motor on said chassis wall connected to said drive rollers through one-way forward and reverse drive clutches respectively, and means for raising the pressure roller off said forward drive roller and simultaneously releasing the other pressure roller in response to reversing of said drive motor.

10. A camera as defined in claim 9, a slide on the back of said chassis wall biased downwardly and having mounting posts extending through vertical slots in said wall over each film frame holder and adapted for receiving a pressure plate, and solenoid means for raising said slide and releasing the corresponding film.

11. A camera as defined in claim 10, there being two film frame holders for full size and half size film respectively, with corresponding film frames, the circumference of said drive rollers being substantially equal to the length of one frame of said full size film, control cams driven by said drive motor at the same and double the speed of said drive rollers, control switches operated by said cams for operating said drive motor selectively through one switch or the other in accordance with the size of film being used, for advancing the film through one frame length in each cycle of operation.

12. A camera as defined in claim 11, manual means for raising both pressure rollers and said slide for threading the film through the camera, and a signal light on said camera casing responsive to displacement of said manual means.

References Cited in the file of this patent

UNITED STATES PATENTS

| | | |
|---|---|---|
| 1,161,683 | Hutter | Nov. 23, 1915 |
| 1,466,774 | Wassilieff | Sept. 4, 1923 |
| 1,712,854 | Thonet | May 14, 1929 |
| 2,099,681 | Draeger | Nov. 23, 1937 |
| 2,177,135 | Fassel | Oct. 24, 1939 |
| 2,403,587 | Doyle | July 9, 1946 |
| 2,419,474 | Wilcox | Apr. 22, 1947 |
| 2,476,677 | Merritt | July 19, 1949 |
| 2,482,596 | Rattray | Sept. 20, 1949 |
| 2,610,540 | Beitz | Sept. 16, 1952 |
| 2,616,331 | Pavelle | Nov. 4, 1952 |
| 2,764,059 | Bottoms | Sept. 25, 1956 |

FOREIGN PATENTS

| | | |
|---|---|---|
| 407,965 | Germany | Jan. 6, 1925 |